United States Patent
Hebert et al.

(10) Patent No.: US 11,212,281 B2
(45) Date of Patent: Dec. 28, 2021

(54) ATTACKER DETECTION VIA FINGERPRINTING COOKIE MECHANISM

(71) Applicant: SAP SE, Walldorf (DE)

(72) Inventors: Cedric Hebert, Mougins (FR); Anderson Santana De Oliveira, Antibes (FR); Merve Sahin, Antibes (FR)

(73) Assignee: SAP SE, Walldorf (DE)

( * ) Notice: Subject to any disclaimer, the term of this patent is extended or adjusted under 35 U.S.C. 154(b) by 200 days.

(21) Appl. No.: 16/549,087

(22) Filed: Aug. 23, 2019

(65) Prior Publication Data
US 2021/0075790 A1 Mar. 11, 2021

(51) Int. Cl.
*H04L 29/06* (2006.01)

(52) U.S. Cl.
CPC ...... *H04L 63/0876* (2013.01); *H04L 63/0236* (2013.01); *H04L 63/102* (2013.01); *H04L 63/1416* (2013.01); *H04L 63/1491* (2013.01); *H04L 2463/082* (2013.01)

(58) Field of Classification Search
None
See application file for complete search history.

(56) References Cited

U.S. PATENT DOCUMENTS

| | | | | |
|---|---|---|---|---|
| 9,032,217 B1 * | 5/2015 | Brandwine | ............ | H04L 67/10 713/185 |
| 10,169,460 B2 * | 1/2019 | Salusky | ................ | G06F 16/313 |
| 2009/0089869 A1 * | 4/2009 | Varghese | ........... | G06Q 20/4014 726/7 |
| 2012/0317622 A1 * | 12/2012 | Harjanto | ................. | G06F 21/44 726/4 |
| 2014/0310779 A1 * | 10/2014 | Lof | ......................... | G06F 21/10 726/4 |
| 2015/0237038 A1 * | 8/2015 | Grajek | .................... | H04L 67/10 726/8 |
| 2017/0085567 A1 * | 3/2017 | Long | ....................... | H04L 67/02 |
| 2018/0367946 A1 * | 12/2018 | Best | ........................ | H04L 67/26 |
| 2019/0384956 A1 * | 12/2019 | Whelan, III | ............. | G06F 21/44 |
| 2020/0311309 A1 * | 10/2020 | Dawer | ................ | G06F 21/6245 |

\* cited by examiner

*Primary Examiner* — Joseph P Hirl
*Assistant Examiner* — Hassan Saadoun
(74) *Attorney, Agent, or Firm* — Sterne, Kessler, Goldstein & Fox P.L.L.C.

(57) ABSTRACT

Disclosed herein are system, method, and computer program product embodiments for detecting cyber-attack. In an embodiment, a server receives a request to an application from a user device. The server determines that there is no cookie in the received request. The server then generates a new fingerprinting cookie and sends a verification request to the user device to verify the identity of a user. When the server receives the verification reply from the user device, the server determines that the verification reply is valid, marks the new cookie as a verified cookie, and transfers the request to the application for processing. The server can also unverify the verified cookie when the verified cookie is included in a malicious request. The server can determine that a request is malicious by analyzing functions the user wishes to perform using the request.

20 Claims, 3 Drawing Sheets

ATTACKER DETECTION VIA FINGERPRINTING COOKIE MECHANISM

BACKGROUND

Cyber-attacks are one of the major threats for computer networks and applications. A successful cyber-attack is capable of stealing valuable information from the computer server, costing tremendous computational and memory resources, and even bringing down the entire network and computer system. A cyber-attack may be carried out manually by a human operating a machine, or automatically by an attacking program. Generally, the attacking program operated attack makes frequent requests to the system in order to create an overrun situation. Such attacks may appear to be a normal request that a legitimate user would perform. Often, cyber-attackers hide their identities using proxies so that their activities are difficult to detect or trace back. Attackers may obtain a legitimate users' login-in information through phishing website/email, leaked data from other web servers, or by compromising the legitimate user's machine. In such a way, attackers may spoof the legitimate user's identify or take over control of the user's machine to launch an attack. These (and other) attacking strategies make the detection and prevention of cyber-attacks a difficult task.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
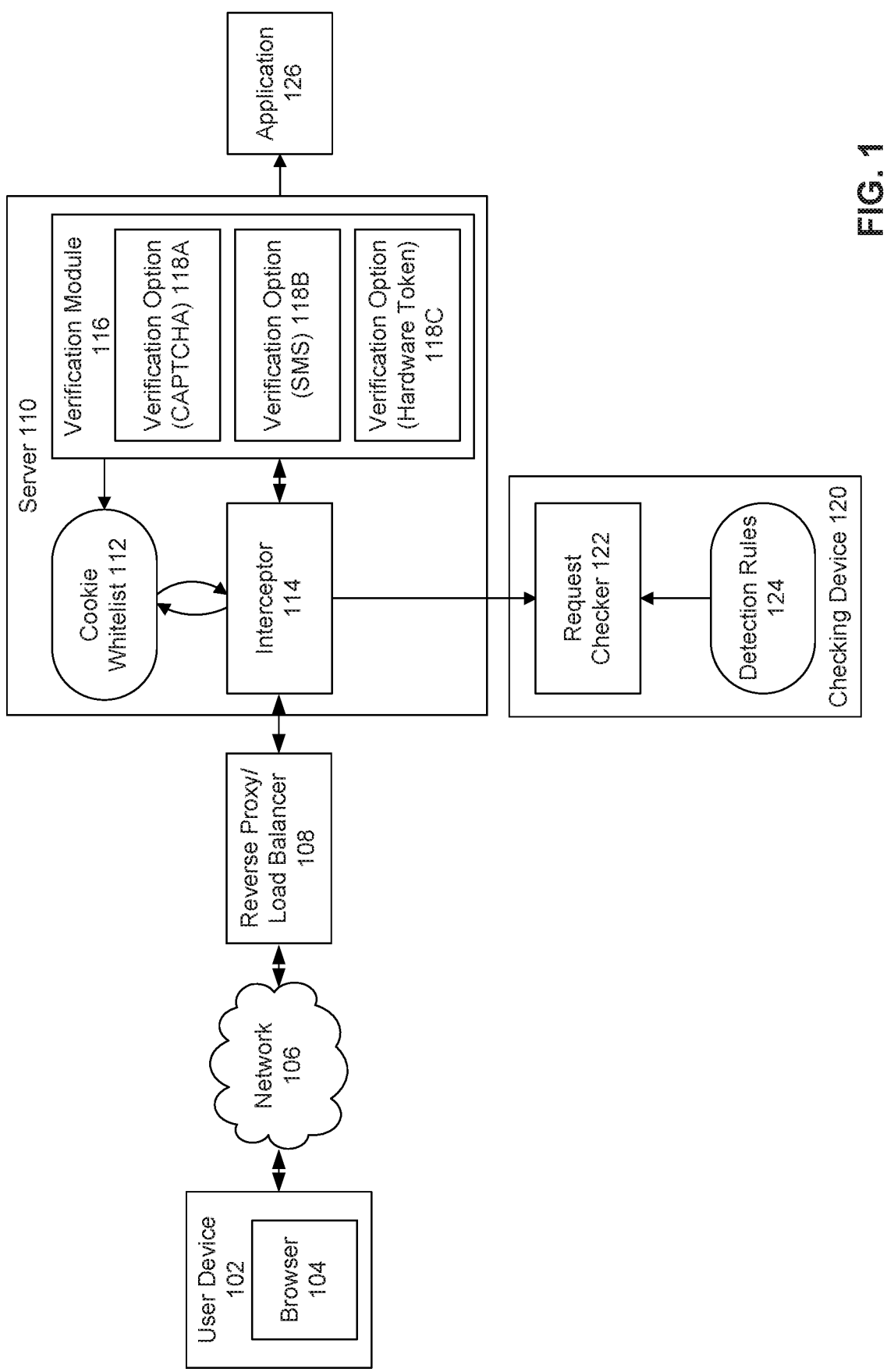
FIG. 1 is a block diagram illustrating an example cyber-attack detection system that includes a computer server, according to some embodiments.

Provided herein are system, apparatus, device, method and/or computer program product embodiments, and/or combinations and sub-combinations thereof, for detecting cyber-attacks from user requests. The embodiments disclosed herein may identify and track attackers without creating addition burden for legitimate users.

In an embodiment, a cyber-attack detection system may identify a malicious request by analyzing the function(s) the request is intended to perform, as well as the user who issued the request. For example, a request to retrieve an administration console on an application may be a malicious. Attackers may take certain paths to the administration console based on their experiences or guessing. In some cases, these paths do not exist in a server. When attackers send the request including such non-existing paths, the request is deemed to be malicious. In addition, some commonly used paths to the administration console that are not used in the server may be continuously monitored, and any request associated with these commonly used paths would be deemed to be malicious. In some embodiments, a server may not have an administration console. Hence any request to retrieve the administration console would be deemed to be malicious. Upon detecting the request via analyzing such activity, the server may react to the request by either blocking the request or rerouting the request to a honeypot. As will be appreciated by persons skilled in the relevant art(s), a honeypot is a network system that is configured to appear to be a high value target or an exact clone of the application. By routing the request to the honeypot, harm to the system is prevented, and the malicious user may be monitored without the malicious user being able to detect such monitoring.

As another example, a request to login into a personal account may be typically considered a normal request. The server would forward the request to the appropriate application to execute the request.

A malicious user may be an attacker who operates on his own device, or on a legitimate user's device that is compromised. A malicious request may be an attack launched by attacker to compromise a computer system, a server, or steal funds and personal data from a person account, to name just some examples. As used herein, generally, the terms "malicious user" and "attacker" are interchangeable, and "malicious requests" are requests made by malicious users or attackers.

In practice, the request for administration console and the request for login into a personal account (as discussed above) may come from the same user. In an embodiment, if the request for administration is deemed to be a malicious request, then the request for login into a personal account (that is made by the same user) should also be deemed to be malicious. The server reacts to both requests from the same user in the same manner. Hence, it is beneficial to identify the user so that the requests from the user may be tied to the user. This is especially true if the user is malicious, as illustrated by the above example. In such a case, the server reacts to subsequent requests from the user to protect the system from attack.

In some embodiments, the server may need to identify a previously visited user by his fingerprinting cookie. The server assigns a unique fingerprinting cookie to each user when no fingerprinting cookie is detected in the request from the user. In the example where the request to obtain the administration console is deemed to be malicious, then the fingerprinting cookie assigned to the user is recorded as malicious. Thereafter, subsequent requests from the user would have the same fingerprinting cookie and thus would be identified as malicious immediately regardless of the nature of the requests. In such a way, if the same user later sends a login request, the server would deem the request malicious (even though a login request is usually considered a legitimate activity), thereby protecting the system and legitimate user information.

In an embodiment, a malicious user may search for and delete his fingerprinting cookie before sending a request. In this case, requests issued by the user would not include a fingerprinting cookie, and thus the server would assume that the request is from a new user. This is a way for a malicious user to defeat the fingerprinting cookie mechanism described above.

In an embodiment, in order to solve this problem, the server does not automatically assign a fingerprinting cookie upon detection of what appears to be a new user. Instead, if the user sending the request does not have an existing fingerprinting cookie, the server treats the request as suspicious and requires the user to verify his identity via some verification process. If the user cannot verify his identity, the request will stay within the verification process and may be dropped eventually.

In some embodiments, the malicious user may be able to compromise the system of a legitimate user. Hence, the malicious user would be able to verify his identity using the legitimate user's compromised system. But even in such cases, the embodiments described herein are able to reduce malicious request frequency and effectiveness, especially in the case of program driven automatic attacks. For example, if the malicious user sends a request without a fingerprinting cookie, the malicious user is sent to the home page and a new fingerprinting cookie is assigned, followed by a verification process (as described herein). The verification process may be time and resource consuming, thereby slowing down the attacks. In addition, an alarm may be raised to the server whenever a new cookie is assigned. Then, if multiple alarms are repeatedly raised in a short period of time, the malicious user would be noticed and a system operator may inspect the system manually and take appropriate action. Thus, the malicious user would draw extra attention to himself when repeatedly deleting fingerprinting cookie and going through the verification process, and this would assist the system operator to detect malicious activity. Such functionality could also be performed automatically by the server.

Once a malicious user is identified as malicious by his activity or the fingerprinting cookie, the server may block the malicious user from accessing the server by dropping requests from the malicious user. Alternatively, the server may route the requests from the malicious user to a honeypot. As will be appreciated by persons skilled in the relevant art(s), the honeypot appears to the malicious user as a legitimate target application or system. In reality, however, the honeypot may be isolated from the system and store dummy data that has no real meaning or value. Thus, attacking the honeypot does not harm the server or the user data. Since the malicious user may not realize the request has been rerouted to a honeypot, the malicious user keeps sending the malicious request to the honeypot which wastes his resources and time. In addition, the honeypot can be monitored, thereby allowing the server to monitor and keep track of the malicious user.

Embodiments described herein encourage a malicious user to keep working within a single session with one fingerprinting cookie to avoid consuming resources via the verification process described above (and further described below). Hence, the entire session of the malicious user (consisting of multiple requests) may be detected. Once a malicious user has been identified as such by his fingerprinting cooking, subsequent requests in the same session by the user are also deemed to be malicious and thus more easily dealt with.

These and other features of example embodiments will now be discussed in greater detail with respect to the corresponding figures.

FIG. 1 is a block diagram illustrating an example cyber-attack detection system 100 that includes a server 110, according to some embodiments. Assume that a user initiates a request from browser 104 of a user device 102.

In an embodiment, the user device 102 (and associated user) may be legitimate or malicious. In addition, even if legitimate, the user device 102 may be compromised by a malicious user.

The user device 102 and browser 104 may have an internet protocol (IP) address, browser information, and other information which may be used as a fingerprint for the user device 102. The user device 102 may include any computing systems, computing devices, laptop, desktop, mobile phone, tablet, software modules, database systems, virtual machines, wearables, appliances, Internet of Things (IoT) device, group of multiple machines, etc., to name just some examples.

The user device 102 may send requests through network 106. The network 106 may be wired, wireless, a wide area network (WAN), a local area network (LAN), or any combination thereof. Requests may then be directed to the server 110 via a reverse proxy/load balancer 108. The reverse proxy/load balance 108 may be a server or a computing device connecting to the server 110 (as well as other servers). In some embodiments, the request reaches the server 110 directly without passing through the reverse proxy/load balancer 108.

In an embodiment, the server 110 may include an interceptor 114. The interceptor 114 is connected to a cookie whitelist 112, a verification module 116, and a checking device 120. After receiving the request from the reverse proxy/load balancer 108, the interceptor 114 may analyze the request and the fingerprinting cookie in the request.

The cookie whitelist 112 stores verified fingerprinting cookies of legitimate users. The cookie whitelist 112 reflects the most current list of the verified fingerprinting cookies. In some embodiments, the cookie whitelist 112 sets a predetermined time period for each fingerprinting cookie, so that a given fingerprinting cookie expires if the fingerprinting cookie is not accessed in the time period. The expired fingerprinting cookies are deleted from the cookie whitelist 112 in order to reduce the memory burden. A fingerprinting cookie may become expired as a result of many reasons. For example, the associated user may stop using the server 110 and, thus, the user's fingerprinting cookie will no longer be accessed. In some embodiments, the user may delete his fingerprinting cookie in the user device 102. Then, when the user sends a new request to the server 110 through the user device, a new fingerprinting cookie would be generated and assigned. In such a case, the original fingerprinting cookie remains in the cookie whitelist 112, but will not be used again since it has been deleted from the user device 102; eventually this original fingerprinting cookie will expire and be deleted from the cookie whitelist 112, as explained above.

In an embodiment, the verification module 116 verifies the identity of a user when no fingerprinting cookie is provided in a request from the user device 102. In some embodiments, the verification module 116 employs an automated public Turing test to discern computers from humans (such as CAPTCHA) 118A. The CAPTCHA is effective against attacks launched by an automatic attack program. For example, a denial of service (DoS) attack consists of a series of high-frequency automatic attacks to exhaust the target system resources such as the server 110. The interceptor 114 requires that a CAPTCHA puzzle be solved prior to assigning a new fingerprinting cookie to a user. The CAPTCHA puzzle may be difficult for a machine to solve. Even if the automatic attack program successfully solves the puzzle, the process is time-consuming and, thus, greatly slows down the attack and makes the attack a much smaller treat. Other methods like crypto-puzzle used in blockchain technology may also be used for verification, instead of or in addition to the CAPTCHA.

In some embodiments, the verification module 116 employs two-factor authentication method 118B, such as a short message service (SMS). For example, when verification is required, a SMS message is sent to the user device 102. The user enters the sequence included in the message to complete the verification. The verification option 118B could also employ a text message system to send a text message through a mobile network to a separate device such as a cellphone owned by the user. Similar to the CAPTCHA verification option 118A, the verification option 118B is time-consuming for an automatic attack program to repeatedly perform given at least the nature delay caused by the SMS message process. The attack program also needs to extract the sequence from the SMS message which consumes extra computational power and memory. If the attack is launched from a compromised user device 102 owned by a legitimate user and a text message verification is required, the malicious user would also need to compromise the cell phone of the legitimate user to obtain the text message which is difficult if not impossible.

In some embodiments, the verification module 116 employs trusted execution environment (TEE) 118C which may be a system chip present in the user device 102. Upon request by the verification module 116, the browser 104 may call the TEE in user device 102 to provide a unique hardware fingerprint or hardware token. Since TEE requires hardware physically attached to the user device 102, a malicious user would not have access to TEE. When the malicious user compromises the legitimate user's account and login credentials, the malicious user would not be able to complete the TEE verification required by verification option 118C. However, if user device 102 is compromised, the malicious user would be able to control the browser 104 to complete the TEE verification. In such a case, the server 110 may identify the malicious user by analyzing his activity as described above. Once the hardware fingerprint or hardware token is confirmed to be associated with a malicious user, the hardware fingerprint or hardware token may be used to identify subsequent attacks from the same user device 102 controlled by the malicious user.

In an embodiment, after the verification requested by verification module 116 is completed, the newly assigned fingerprinting cookie is added to the cookie whitelist 112 by the verification module 116. Alternatively, the verification module 116 may notify the interceptor 114 to add the newly assigned fingerprinting cookie to the cookie whitelist 112.

In some embodiments, after the identity of user device 102 is verified, the checking device 120 further checks the user's request by analyzing what the user is trying to accomplish with the request. In an embodiment, the checking device 120 may be an external device associated with the server 110 or an internal module within the server 110 having at least one physically independent hardware component, or at least one of each logically independent memory and processing unit. A request checker 122 may be a physical or logical component in the checking device 120. The request checker 122 follows detection rules 124 which are stored in the memory of the checking device 120. The detection rules 124 are used to determine if a request is malicious. In some embodiments, the detection rules 124 may be based on certain properties of the request. For example, when the request tries to obtain an administration console through a path, where the administration console does not exist or the path is incorrect, the associated detection rule 124 would deem that the request and the user device are malicious. In addition, the detection rules 124 may be based on a predetermined frequency of requests from a user device 102. For example, attacks like DoS require much more frequent requests comparing to a normal user. Hence, upon detecting that frequency of the requests is larger than the predetermined frequency, the requests and the user device are considered malicious.

After the checking device 120 determines that the request is legitimate, the interceptor 114 forwards the request to the application 126 and the request is executed.

Figure 2:
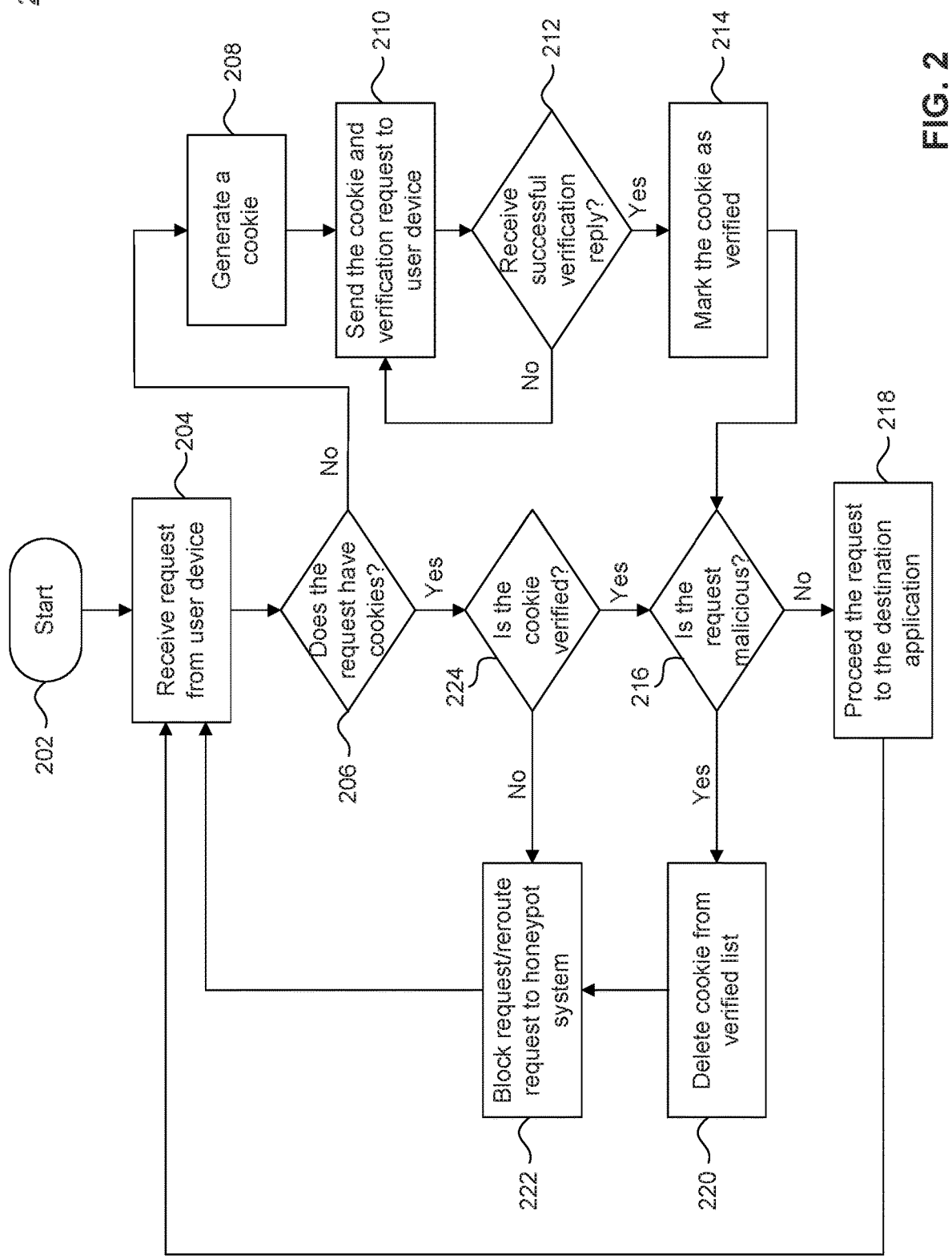
FIG. 2 is a flowchart illustrating a process for cyber-attack detection, according to some embodiments.

FIG. 2 is a flowchart for a method 200 for cyber-attack detection, according to an embodiment. Method 200 may be performed by processing logic that may comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art.

Method 200 shall be described with reference to FIG. 1. However, method 200 is not limited to that example embodiment.

In 204, the server 110 receives a request from a user device 102. The request may comprise information like the IP address or port number pertaining to the user device 102, the address of the server 110, information like the port number pertaining to the application 126 that will process the request, description of the request, and a fingerprinting cookie that is stored in the user device 102 (assuming a fingerprinting cookie was previously generated for the user of the user device 102).

In 206, the interceptor 114 determines whether the request includes a fingerprinting cookie. If the request does not include a fingerprinting cookie, or if the fingerprinting cookie is in an improper format, then the interceptor 114 presumes the user and the user device 102 are malicious, and control then moves to 208.

In 208, the interceptor 114 generates a new fingerprinting cookie for the user device 102. The new fingerprinting cookie may be generated based on a general protocol or format of fingerprinting cookies. For example, the new fingerprinting cookie may include the IP address of the user device 102, information pertaining to browser 104, and/or authentication information such as login status, or a combination thereof.

In 210, the verification module 116 generates a verification request based on at least one verification option 118. The selection of verification options 118 may be determined based on the nature of the request (such as the damage the request could potentially cause if the user device 102 is malicious), and system preferences, to name just two examples. For example, in some embodiments, the server 110 may be designed to have enhanced protection. In such a case, multiple verification options 118 may be selected in 210, such as including both CAPTCHA 118A and SMS message verification 118B in the verification request. The server 110 may also be designed to have enhanced flexibility. In such a case, the verification options 118 may be used sequentially. For example, the verification module 116 may generate the verification request to first require authentication by TEE or other hardware token 118C. If the user satisfies TEE 118C, then the user is considered verified. If the user is not able to satisfy TEE 118C, then the verification request would require the user to satisfy both CAPTCHA 118A and SMS 118B in order to be verified.

Further in 210, the verification module 116 may send the verification request to the interceptor 114. The interceptor 114 sends the fingerprinting cookie along with the verification request back to the user device 102. The fingerprinting cookie and the verification request may be in the same data packet or different data packets. In some embodiments, the verification module 116 may send the verification request directly to user device 102 without going through interceptor 114. In such cases, a packet containing the verification request may arrive before or after a packet containing the fingerprinting cookie. In some embodiments, the interceptor 114 may not send the fingerprinting cookie to the user device 102 in 210.

In 212, the interceptor 114 receives a reply to the verification request from the user device 102. This may be called a verification reply.

Verification of the user device 102 (based on the verification reply) may fail for at least one of two reasons: (1) the interceptor 114 does not receive the verification reply within a predetermined time limit; and/or (2) the verification reply is not valid (that is, the verification reply does not satisfy the verification option(s) 118 that were included in the verification request).

When verification fails in 212, the interceptor 114 may repeat the verification process by returning to 210. The interceptor 114 may place a limit on the maximum number of verification requests that may be sent to a user device 102 before dropping the request and potentially designating the user device 102 as malicious.

If the user device 102 is verified in 212, then control moves to 214.

In 214, the verification module 116 notifies the interceptor 114 to mark the new fingerprinting cookie as verified by adding the new fingerprinting cookie into the cookie whitelist 112. In some embodiments, the verification module 116 may add the new fingerprinting cookie into the cookie whitelist 112 itself.

In some embodiments, step 208 is not performed. Instead, 210 and 212 are performed, and then step 208 is performed (that is, the new fingerprinting cookie is generated) after the user device 102 is verified via steps 210 and 212. In such a case, it takes longer for the user device 102 to receive the fingerprinting cookie from the interceptor 114. However, this delay is beneficial if the user device 102 is malicious, since it further reduces the frequency and effectiveness of the malicious request.

After the fingerprinting cookie is marked as verified in 214, control moves to 216, which is described below.

Referring back to 206, if the interceptor 114 determines that the request from the user device 102 has a fingerprinting cookie, then control moves to 224.

In 224, the interceptor 114 compares the fingerprinting cookie with those in the cookie whitelist 112. If the fingerprinting cookie is not verified—that is, the fingerprinting cookie is not in the cookie whitelist 112—then the interceptor 114 presumes the request is malicious, and control moves to 222.

In 222, the interceptor 114 either blocks the request, or reroutes the request to the honeypot system, as described above.

Referring back to 224, if the interceptor 114 determines that the fingerprinting cookie is in the cookie whitelist 112, then the server 110 forwards the request to the checking device 120 and control moves to 216.

In 216, the checking device 120 checks the request by analyzing what the user wants to achieve through the request, as described above. If the checking device 120 determines that the request is malicious based on the detection rules 124, then the checking device 120 notifies the interceptor 114 and control moves to 220.

In 220, the interceptor 114 unmarks the fingerprinting cookie by deleting the fingerprinting cookie from the cookie whitelist 112. Then, control moves to 222.

Referring back to 216, if the checking device 120 determines that the request is not malicious, then the checking device 120 notifies the interceptor 114 and control moves to 218.

In 218, the server 110 forwards the request to the application 126 and the request is processed.

Figure 3:
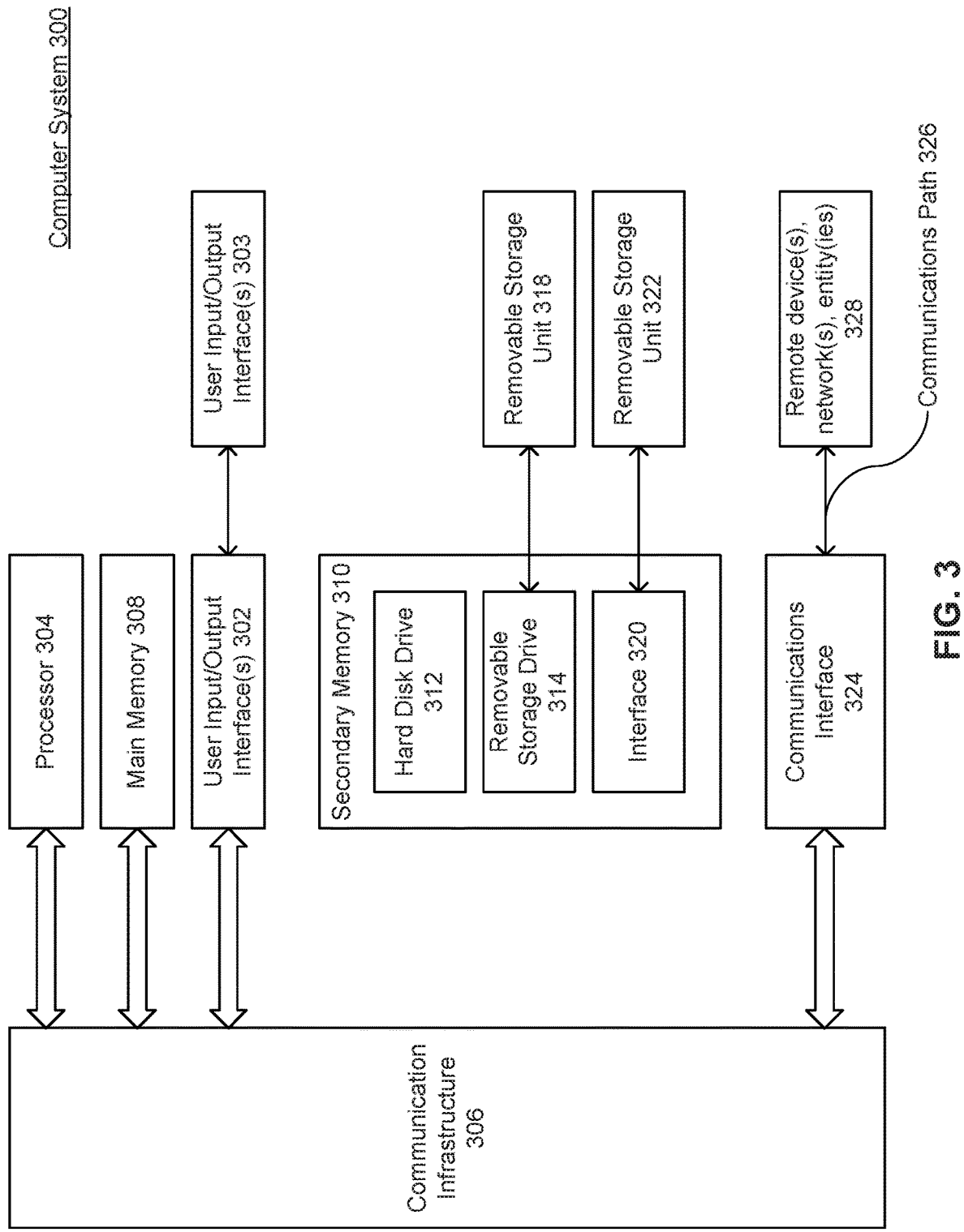
FIG. 3 is an example computer system useful for implementing various embodiments.

Various embodiments may be implemented, for example, using one or more well-known computer systems, such as computer system 300 shown in FIG. 3. One or more computer systems 300 may be used, for example, to implement any of the embodiments discussed herein, as well as combinations and sub-combinations thereof.

Computer system 300 may include one or more processors (also called central processing units, or CPUs), such as a processor 304. Processor 304 may be connected to a communication infrastructure or bus 306.

Computer system 300 may also include user input/output device(s) 303, such as monitors, keyboards, pointing devices, etc., which may communicate with communication infrastructure 306 through user input/output interface(s) 302.

One or more of processors 304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 may also include a main or primary memory 308, such as random access memory (RAM). Main memory 308 may include one or more levels of cache. Main memory 308 may have stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 may include a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 may read from and/or write to removable storage unit 318.

Secondary memory 310 may include other means, devices, components, instrumentalities or other approaches for allowing computer programs and/or other instructions and/or data to be accessed by computer system 300. Such means, devices, components, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 may enable computer system 300 to communicate and interact with any combination of external devices, external networks, external entities, etc. (individually and collectively referenced by reference number 328). For example, communication interface 324 may allow computer system 300 to communicate with external or remote devices 328 over communications path 326, which may be wired and/or wireless (or a combination thereof), and which may include any combination of LANs, WANs, the Internet, etc. Control logic and/or data may be transmitted to and from computer system 300 via communication path 326.

Computer system 300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for validating a request from a user device, wherein the request is to be processed by an application, the method comprising:
    receiving, by a server, the request from the user device;
    determining, by the server, that the request does not contain a fingerprinting cookie;
    generating, by the server, a new fingerprinting cookie for a user associated with the user device;
    sending, by the server, a verification request and the new fingerprinting cookie to the user device;
    receiving, by the server, a valid verification reply from the user device;
    marking, by the server, the new fingerprinting cookie as a verified cookie;
    providing, by the server, the request to the application for processing;
    receiving, by the server, a second request from the user device, wherein the second request includes the verified cookie;
    determining, by the server, the second request is malicious by analyzing functions the user wishes to perform using the second request;
    unverifying the verified cookie; and blocking the second request or routing the second request to a honeypot system.

2. The computer-implemented method of claim 1, further comprising:
   determining, by a request checking device, that the request is not malicious by analyzing functions the user wishes to perform using the request.

3. The computer-implemented method of claim 2, wherein the request checking device is a component of the server.

4. The computer-implemented method of claim 1, wherein the verification request comprises CAPTCHA, cryptogram puzzles, two-factor authentication or trusted execution environment technology.

5. The computer-implemented method of claim 1, further comprising:
   adding the verified cookie to a cookie whitelist.

6. The computer-implemented method of claim 1, wherein the unverifying the verified cookie comprising:
   deleting the verified cookie from a cookie whitelist.

7. A system, comprising:
   a memory; and
   at least one processor coupled to the memory and configured to:
      receive a request from a user device to an application;
      determine that the request does not contain a fingerprinting cookie;
      generate a new fingerprinting cookie for a user associated with the user device;
      send a verification request and the new fingerprinting cookie to the user device;
      receive a valid verification reply from the user device;
      mark the new fingerprinting cookie as a verified cookie;
      provide the request to the application for processing;
      receive a second request from the user device to the application, wherein the second request includes the verified cookie;
      determine the second request is malicious by analyzing functions the user wishes to perform using the second request;
      unverify the verified cookie; and
      block the second request or reroute the second request to a honeypot system.

8. The system of claim 7, wherein a request checking device is configured to determine the request is not malicious by analyzing functions the user wishes to perform using the request.

9. The system of claim 8, wherein the request checking device is part of the at least one processor.

10. The system of claim 7, wherein the verification request comprises CAPTCHA, cryptogram puzzles, two-factor authentication or trusted execution environment technology.

11. The system of claim 7, wherein the at least one processor is further configured to:
    add the verified cookie to a cookie whitelist.

12. The system of claim 7, wherein to unverify the verified cookie, the at least one processor is configured to:
    delete the verified cookie from a cookie whitelist.

13. A non-transitory computer-readable device having instructions stored thereon that, when executed by at least one computing device, causes the at least one computing device to perform operations to validate a request from a user device, wherein the request is to be processed by an application, the operations comprising:
    receiving, by the at least one computing device, the request from the user device;
    determining, by the at least one computing device, that the request does not contain a fingerprinting cookie;
    generating, by the at least one computing device, a new fingerprinting cookie for a user associated with the user device;
    sending, by the at least one computing device, a verification request and the new fingerprinting cookie to the user device;
    receiving, by the at least one computing device, a valid verification reply from the user device;
    marking, by the at least one computing device, the new fingerprinting cookie as a verified cookie;
    providing, by the at least one computing device, the request to the application for processing;
    receiving, by the at least one computing device, a second request from the user device, wherein the second request includes the verified cookie;
    determining, by the at least one computing device, the second request is malicious by analyzing functions the user wishes to perform using the second request;
    unverifying, by the at least one computing device, the verified cookie by deleting it from a cookie whitelist; and
    blocking, by the at least one computing device, the second request or rerouting the second request to a honeypot system.

14. The device of claim 13, the operations further comprising:
    determining, by a request checking device, that the request is not malicious by analyzing functions the user wishes to perform using the request.

15. The device of claim 14, wherein the request checking device is part of the at least one computing device.

16. The device of claim 13, wherein the verification request comprises CAPTCHA, cryptogram puzzles, two-factor authentication or trusted execution environment technology.

17. The device of claim 13, the marking further comprising:
    adding the verified cookie to a cookie whitelist.

18. The computer-implemented method of claim 6, wherein the determining the second request is malicious further comprises detecting non-existing paths in the second request.

19. The system of claim 7, wherein the at least one processor is further configured to determine the second request is malicious by detecting non-existing paths in the second request.

20. The device of claim 13, wherein the determining the second request is malicious further comprises detecting non-existing paths in the second request.

* * * * *